US012729740B2

(12) United States Patent
Allison et al.

(10) Patent No.: US 12,729,740 B2
(45) Date of Patent: Sep. 8, 2026

(54) HYBRID CRUSH ZONE SHOCK ABSORBER APPARATUS, SYSTEMS, AND METHODS OF USING THE SAME

(71) Applicant: Savior Brain Inc., Arlington, VA (US)

(72) Inventors: Jeffrey Daniel Allison, Lake Oswego, OR (US); Christoph Eduard Mack, Seattle, WA (US)

(73) Assignee: Savior Brain Inc., Arlington, VA (US)

( * ) Notice: Subject to any disclaimer, the term of this patent is extended or adjusted under 35 U.S.C. 154(b) by 311 days.

(21) Appl. No.: 18/220,981

(22) Filed: Jul. 12, 2023

(65) Prior Publication Data

US 2024/0093746 A1 Mar. 21, 2024

Related U.S. Application Data

(60) Provisional application No. 63/368,157, filed on Jul. 12, 2022.

(51) Int. Cl.

*F16F 7/12* (2006.01)
*A42B 3/06* (2006.01)
*A42B 3/12* (2006.01)
*F16F 7/00* (2006.01)

(52) U.S. Cl.

CPC .............. *F16F 7/003* (2013.01); *A42B 3/067* (2013.01); *A42B 3/121* (2013.01); *F16F 7/12* (2013.01); *F16F 7/121* (2013.01); *F16F 2224/048* (2013.01); *F16F 2230/0023* (2013.01)

(58) Field of Classification Search

CPC .... F16F 7/003; F16F 7/12; F16F 7/121; F16F 2230/0023; A42B 3/067; A42B 3/06

USPC ........ 188/371, 372, 376, 377; 267/141, 136, 267/139, 140.11, 142, 145

See application file for complete search history.

(56) References Cited

U.S. PATENT DOCUMENTS

| | | | | |
|---|---|---|---|---|
| 2,579,186 | A | | 12/1951 | Haboush |
| 2,875,861 | A | | 3/1959 | Lucien |
| 3,039,109 | A | | 6/1962 | Simpson |
| 3,369,521 | A | * | 2/1968 | Meeder, Jr. ........... G01P 15/036 73/11.01 |
| 3,373,716 | A | * | 3/1968 | Williams ................ G01P 15/04 73/11.01 |
| 3,600,714 | A | | 8/1971 | Cade et al. |
| 3,609,764 | A | | 10/1971 | Morgan |

(Continued)

FOREIGN PATENT DOCUMENTS

| | | | |
|---|---|---|---|
| CN | 103284393 | A | 9/2013 |
| CN | 104514837 | A | 4/2015 |

(Continued)

*Primary Examiner* — Thomas J Williams

(74) *Attorney, Agent, or Firm* — Harness, Dickey & Pierce, P.L.C.

(57) ABSTRACT

Impact protection for people and goods involved in athletics, transportation, industrial, and military activities comprises a hybrid crush zone shock absorber apparatus, systems, and methods of using the same. More specifically, the present invention reduces forces transmitted to a person or item exposed to impact. Primary applications are in protective articles such as helmets and body padding, surfaces which people or goods may impact, and shock isolation packaging. In addition to reduction in transmitted impact forces, our invention provides clear, irreversible visual indication of the state of readiness of the protective gear to which it is fitted.

14 Claims, 2 Drawing Sheets

(56) References Cited

U.S. PATENT DOCUMENTS

| | | | | |
|---|---|---|---|---|
| 3,761,959 | A | 10/1973 | Dunning | |
| 3,831,923 | A | 8/1974 | Meldrum | |
| 3,849,801 | A | 11/1974 | Holt et al. | |
| 3,872,511 | A | 3/1975 | Nichols | |
| 3,946,441 | A * | 3/1976 | Johnson | A42B 3/063 2/412 |
| 3,994,022 | A | 11/1976 | Villari et al. | |
| 3,995,901 | A | 12/1976 | Filbert, Jr. et al. | |
| 4,098,525 | A * | 7/1978 | Schwanz | B62D 1/11 188/377 |
| 4,375,108 | A | 3/1983 | Gooding | |
| 4,570,911 | A | 2/1986 | Konishi | |
| 4,657,121 | A * | 4/1987 | Uchida | F16F 7/127 188/376 |
| 4,929,008 | A * | 5/1990 | Esfandiary | B60R 19/36 188/376 |
| 5,181,279 | A | 1/1993 | Ross | |
| 5,204,998 | A | 4/1993 | Liu | |
| 5,323,729 | A * | 6/1994 | Rubey | G01P 15/036 116/203 |
| 5,343,569 | A * | 9/1994 | Asare | A42B 3/0433 2/412 |
| 5,549,327 | A * | 8/1996 | Rusche | B60R 21/04 280/751 |
| 5,815,846 | A | 10/1998 | Calonge | |
| 5,997,077 | A * | 12/1999 | Siebels | F16F 1/371 49/502 |
| 6,154,889 | A | 12/2000 | Moore et al. | |
| 6,343,385 | B1 * | 2/2002 | Katz | A42B 3/00 2/412 |
| 6,453,476 | B1 | 9/2002 | Moore, III | |
| 7,377,580 | B1 * | 5/2008 | Ekladyous | F16F 7/12 296/193.11 |
| 7,766,386 | B2 * | 8/2010 | Spingler | F16F 7/125 280/751 |
| 7,774,866 | B2 | 8/2010 | Ferrara | |
| 8,127,373 | B1 | 3/2012 | Fodemski | |
| 8,387,552 | B2 * | 3/2013 | Branch | G01P 15/036 116/203 |
| 8,856,972 | B2 | 10/2014 | Kirshon | |
| 8,950,735 | B2 | 2/2015 | Reynolds et al. | |
| 9,116,058 | B2 * | 8/2015 | Branch | G01P 15/036 |
| 9,622,531 | B1 * | 4/2017 | Crispino | A42B 3/067 |
| 10,238,950 | B2 | 3/2019 | Kuntz | |
| 10,350,477 | B2 | 7/2019 | Schneider | |
| 10,716,469 | B2 | 7/2020 | Krueger | |
| 11,632,999 | B2 | 4/2023 | Hawkes et al. | |
| 12,013,010 | B2 | 6/2024 | Fanton et al. | |
| 2002/0043809 | A1 * | 4/2002 | Vismara | B60R 19/34 188/371 |
| 2003/0075953 | A1 * | 4/2003 | Hirota | B60R 21/04 296/187.05 |
| 2005/0187043 | A1 | 8/2005 | Miller et al. | |
| 2006/0059606 | A1 | 3/2006 | Ferrara | |
| 2006/0070170 | A1 | 4/2006 | Copeland et al. | |
| 2008/0155735 | A1 | 7/2008 | Ferrara | |
| 2009/0152883 | A1 * | 6/2009 | Lee | F16F 7/12 293/120 |
| 2009/0265839 | A1 | 10/2009 | Young et al. | |
| 2012/0151664 | A1 | 6/2012 | Kirshon | |
| 2013/0125294 | A1 | 5/2013 | Ferrara | |
| 2013/0247284 | A1 | 9/2013 | Hoshizaki et al. | |
| 2013/0283506 | A1 | 10/2013 | Archbold | |
| 2014/0007322 | A1 | 1/2014 | Marz et al. | |
| 2014/0097052 | A1 | 4/2014 | Reynolds et al. | |
| 2014/0137437 | A1 | 5/2014 | Nakano | |
| 2014/0173810 | A1 | 6/2014 | Suddaby | |
| 2014/0208486 | A1 | 7/2014 | Krueger | |
| 2015/0167777 | A1 * | 6/2015 | Hull | B64C 1/14 267/141 |
| 2015/0223545 | A1 | 8/2015 | Fraser et al. | |
| 2015/0230535 | A1 | 8/2015 | McGuckin | |
| 2016/0258503 | A1 | 9/2016 | Beyer | |
| 2018/0343952 | A1 | 12/2018 | Lachance | |
| 2019/0154101 | A1 | 5/2019 | McDonnell | |
| 2019/0350298 | A1 | 11/2019 | Hoshizaki et al. | |
| 2020/0046056 | A1 | 2/2020 | Hawkes et al. | |
| 2024/0093746 | A1 * | 3/2024 | Allison | A42B 3/121 |

FOREIGN PATENT DOCUMENTS

| | | | | |
|---|---|---|---|---|
| DE | 3300276 | A1 | 7/1984 | |
| EP | 0506696 | A1 | 10/1992 | |
| GB | 2131517 | A | 6/1984 | |
| JP | 61171930 | | 8/1986 | |
| JP | 61197836 | | 9/1986 | |
| WO | 1991005489 | A1 | 5/1991 | |
| WO | 2005049384 | A1 | 6/2005 | |
| WO | 2006089235 | A1 | 8/2006 | |
| WO | WO-2016173797 | A1 * | 11/2016 | A42B 3/067 |
| WO | 2018148753 | A1 | 8/2018 | |

* cited by examiner

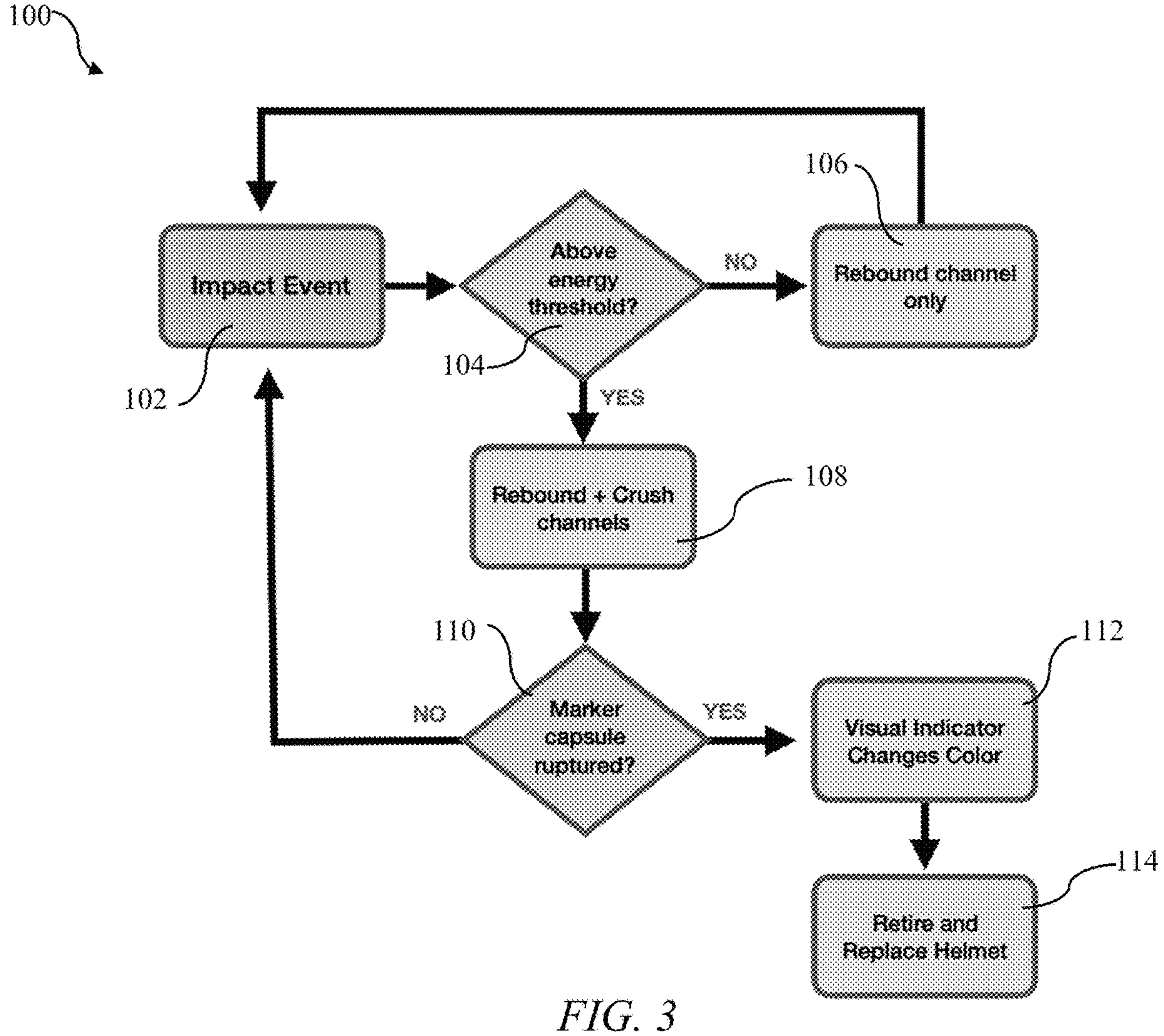
FIG. 3
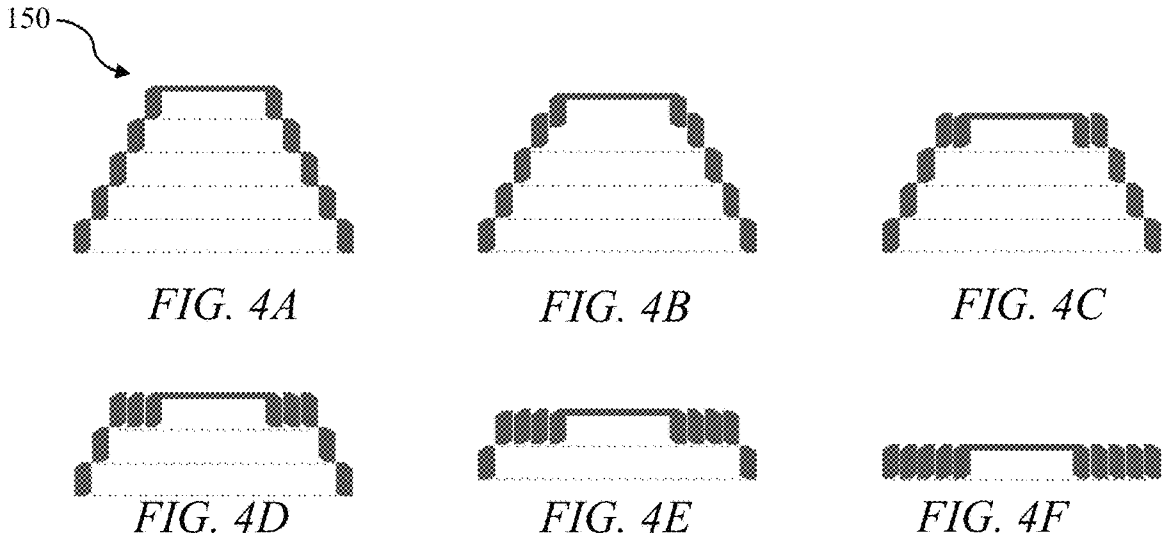
FIG. 4A FIG. 4B FIG. 4C
FIG. 4D FIG. 4E FIG. 4F
100
Impact Event
102
Above energy threshold?
104
NO
Rebound channel only
106
YES
Rebound + Crush channels
108
Marker capsule ruptured?
110
NO
YES
Visual Indicator Changes Color
112
Retire and Replace Helmet
114
150

HYBRID CRUSH ZONE SHOCK ABSORBER APPARATUS, SYSTEMS, AND METHODS OF USING THE SAME

CROSS-REFERENCE TO RELATED APPLICATIONS

The present invention claims priority to U.S. Prov. Pat. App. No. 63/368,157, titled "Hybrid Crush Zone Shock Absorber," filed Jul. 12, 2022, which is incorporated herein by reference in its entirety.

STATEMENT REGARDING FEDERALLY SPONSORED RESEARCH OR DEVELOPMENT

This invention was made with government support under R43 NS119134 awarded by the National Institutes of Health. The government has certain rights in the invention.

TECHNICAL FIELD

The present invention relates to impact protection for people and goods involved in athletics, transportation, industrial, and/or military activities. Specifically, the present invention comprises a hybrid crush zone shock absorber apparatus, systems, and methods of using the same. More specifically, the present invention reduces forces transmitted to a person or item exposed to impact. Primary applications are in protective articles such as helmets and body padding, surfaces which people or goods may impact, and shock isolation packaging. In addition to reduction in transmitted impact forces, our invention provides clear, irreversible visual indication of the state of readiness of the protective gear to which it is fitted.

BACKGROUND

Traditional methods of impact force mitigation have typically relied on compression of closed-cell polymer foams, such as expanded polystyrene (EPS) and expanded polypropylene (EPP). These materials are generally effective at passing regulatory body certification testing and preventing catastrophic skull fracture injury at high energy impacts but offer little attenuation of impacts of low and medium energy. This is due to the highly non-linear force/deflection behavior of monolithic polymer foam structures, which must be designed to be stiff enough to respond to the biggest impacts without "bottoming out." As a result, today's helmets for single impact applications such as cycling, snow sports, equestrian, motor sports, and military applications fail to make efficient use of the entirety of available stroke and impact displacement. In other words, they are too hard to cushion softer impacts and reach their deformation limit quickly against high energy impacts.

A need, therefore, exists for improved shock absorber apparatuses, systems, and methods of using the same. Specifically, a need exists for improved shock absorber apparatuses, systems, and methods of using the same that provide protection against high energy impacts while also providing sufficient protection against low to medium energy impacts. More specifically, a need exists for improved shock absorber apparatuses, systems, and methods of using the same that maintain deformation limits for high energy impacts but are soft enough to cushion softer impacts as well.

For maximum impact energy absorption in minimum mass, "crumple zones" have been employed for many years in a wide variety of applications. From automotive bumpers to highway impact barriers, structures made of ductile materials in collapsible geometry configurations have represented the highest performance in shock attenuation per unit weight and low cost. Personal protective equipment such as helmets and body padding have avoided the use of such permanently deforming elements because of concerns that the products would become dangerous to the user if its protective safety performance is degraded after a change of "state of readiness" following a high energy impact event.

A need, therefore, exists for improved shock absorber apparatuses, systems, and methods of using the same that can be incorporated into personal protective equipment, such as helmets and body padding. In addition, a need exists for improved shock absorber apparatuses, systems, and methods of using the same that are safe to a user thereof, especially after use.

For many helmeted applications, standard recommended procedure is to retire and replace one's helmet following any significant impact event. Considerable confusion exists about what constitutes sufficient reason to retire and/or replace headgear, providing clear visual indication of the service readiness of protective gear. A need, therefore, exists for improved shock absorber apparatuses, systems, and methods of using the same that provides considerable evidence to a user to retire and/or replace shock absorber apparatuses and systems thereof. More specifically, a need exists for improved shock absorber apparatuses, systems, and methods of using the same that provide clear visual indication that the apparatuses and systems thereof are ready-for-use or should be retired and/or replaced.

A perfect shock absorber would use the entire physically available stroke at the minimum, constant force required for dissipation of the impact energy of a given event. In other words, a perfect shock absorber utilizes a square wave force response. A need, therefore, exists for improved shock absorber apparatuses, systems, and methods of using the same that achieves significant replication and/or approximation of a perfect shock absorber. Specifically, a need exists for improved shock absorber apparatuses that provides a relatively close approximation of a perfect square wave force response than any previous solution.

SUMMARY OF THE INVENTION

The present invention relates to impact protection for people and goods involved in athletics, transportation, industrial, and/or military activities. Specifically, the present invention comprises a hybrid crush zone shock absorber apparatus, systems, and methods of using the same. More specifically, the present invention reduces forces transmitted to a person or item exposed to impact. Primary applications are in protective articles such as helmets and body padding, surfaces which people or goods may impact, and shock isolation packaging. In addition to reduction in transmitted impact forces, our invention provides clear, irreversible visual indication of the state of readiness of the protective gear to which it is fitted.

To this end, in an embodiment of the present invention, a shock absorber apparatus is provided. The shock absorber apparatus comprises: a first energy absorber element, wherein the first energy absorber element is temporarily deformable below a predefined energy impact threshold level; and a second energy absorber element, wherein the second energy absorber element is not deformable below the predefined energy impact threshold and further is permanently deformable above the predefined energy impact threshold level.

In an embodiment, the first energy absorber element is disposed in series with the second energy absorber element.

In an embodiment, the first energy absorber element is disposed in parallel with the second energy absorber element.

In an embodiment, the first energy absorber element comprises a first stage and a second stage, wherein the first stage of the first energy absorber element is temporarily deformable below a first predefined energy impact sub-level and further wherein the second stage of the first energy absorber element is not temporarily deformable below the first predefined energy impact sub-level and further wherein the second stage of the first energy absorber element is temporarily deformable above the first predefined energy impact sub-level.

In an embodiment, the shock absorber apparatus further comprises: an indicator associated with the second energy absorber element, wherein the indicator indicates to a user that the second energy absorber element has become permanently deformed when the second energy absorber element becomes permanently deformed.

In an embodiment, the indicator comprises either a septum, bulb, or marker, wherein the septum, bulb, or marker cause indicator fluid to flow into an indicator window when the second energy absorber element becomes permanently deformed, a chemical reaction, wherein the chemical reaction causes the color of the indicator to change, or the apparatus becomes deformed causing the indicator's color to change.

In an embodiment, the first energy absorbing element comprises a viscoelastic material.

In an embodiment, the second energy absorbing element is made from a ductile material.

In an alternate embodiment of the present invention, a system of using a shock absorber apparatus is provided. The system comprises: an article; and a shock absorber apparatus on the article, the shock absorber apparatus comprising a first energy absorber element, wherein the first energy absorber element is temporarily deformable below a predefined energy impact threshold level, and a second energy absorber element, wherein the second energy absorber element is not deformable below the predefined energy impact threshold and further is permanently deformable above the predefined energy impact threshold level.

In an embodiment, the article is a helmet or padding.

In an embodiment, the shock absorber apparatus is disposed on an inside surface of the helmet.

In an embodiment, the first energy absorber element is disposed in series with the second energy absorber element.

In an embodiment, the first energy absorber element is disposed in parallel with the second energy absorber element.

In an embodiment, the first energy absorber element comprises a first stage and a second stage, wherein the first stage of the first energy absorber element is temporarily deformable below a first predefined energy impact sub-level and further wherein the second stage of the first energy absorber element is not temporarily deformable below the first predefined energy impact sub-level and further wherein the second stage of the first energy absorber element is temporarily deformable above the first predefined energy impact sub-level.

In an embodiment, the system further comprises: an indicator associated with the second energy absorber element, wherein the indicator indicates to a user that the second energy absorber element has become permanently deformed when the second energy absorber element becomes permanently deformed.

In an embodiment, the indicator comprises a septum, bulb, or marker, wherein the septum, bulb, or marker causes indicator fluid to flow into an indicator window when the second energy absorber element apparatus becomes permanently deformed, a chemical reaction, wherein the chemical reaction causes the color of the indicator to change, or the apparatus becomes deformed causing the indicator's color to change.

In an embodiment, the first energy absorbing element comprises a viscoelastic material.

In an embodiment, the second energy absorbing element is made from a ductile material.

In an alternate embodiment of the present invention, a method of using a shock absorber apparatus on an article is provided. The method comprises the steps of: providing an article; providing a shock absorber apparatus on the article, the shock absorber apparatus comprising a first energy absorber element, wherein the first energy absorber element is temporarily deformable below a predefined energy impact threshold level, and a second energy absorber element, wherein the second energy absorber element is not deformable below the predefined energy impact threshold and further is permanently deformable above the predefined energy impact threshold level; and impacting the energy absorbing apparatus with a first energy, wherein the first energy causes the first energy absorber element to temporarily deform.

In an embodiment, the first energy causes the second energy absorber element to permanently deform.

It is, therefore, an advantage and objective of the present invention to provide shock absorber apparatuses, systems, and methods of using the same that are improved relative to prior solutions.

Specifically, it is an advantage and objective of the present invention to provide improved shock absorber apparatuses, systems, and methods of using the same that provide protection against high energy impacts while also providing sufficient protection against low to medium energy impacts.

More specifically, it is an advantage and objective of the present invention to provide improved shock absorber apparatuses, systems, and methods of using the same that maintain deformation limits for high energy impacts but are soft enough to cushion softer impacts as well.

In addition, it is an advantage and objective of the present invention to provide improved shock absorber apparatuses, systems, and methods of using the same that can be incorporated into personal protective equipment, such as helmets and body padding.

In addition, it is an advantage and objective of the present invention to provide improved shock absorber apparatuses, systems, and methods of using the same that are safe to a user thereof, especially after use.

Moreover, it is an advantage and objective of the present invention to provide improved shock absorber apparatuses, systems, and methods of using the same that provides considerable evidence to a user to retire and/or replace shock absorber apparatuses and systems thereof.

More specifically, it is an advantage and objective of the present invention to provide improved shock absorber apparatuses, systems, and methods of using the same that provide clear visual indication that the apparatuses and systems thereof are ready-for-use or should be retired and/or replaced.

Further, it is an advantage and objective of the present invention to provide improved shock absorber apparatuses, systems, and methods of using the same that achieves significant replication and/or approximation of a perfect shock absorber.

Specifically, it is an advantage and objective of the present invention to provide improved shock absorber apparatuses that provides a relatively close approximation of a perfect square wave force response than any previous solution.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 illustrates a flowchart depiction of the response of a hybrid crush zone shock absorber to impact energies below, at, and above the design threshold energy, in an embodiment of the present invention.

FIGS. 4A-4F illustrate a hybrid crush zone shock absorber apparatus showing multi-stage collapse, in an embodiment of the present invention.

DETAILED DESCRIPTION OF THE PRESENTLY PREFERRED EMBODIMENTS

Figure 1A:
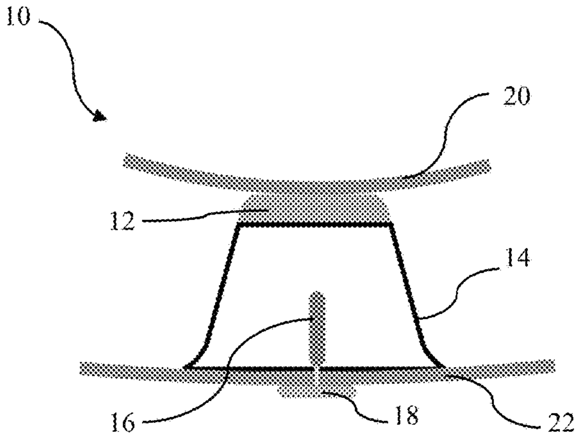
FIGS. 1A and 1B illustrate a hybrid crush zone shock absorber employing an elastic, viscoelastic and/or soft liquid hydraulic element and a permanently deforming element predominately in series arrangement, in an embodiment of the present invention.

The present invention relates to impact protection for people and goods involved in athletics, transportation, and industrial activities. Specifically, the present invention comprises a hybrid crush zone shock absorber apparatus, systems, and methods of using the same. More specifically, the present invention reduces forces transmitted to a person or item exposed to impact. Primary applications are in protective articles such as helmets and body padding, surfaces which people or goods may impact, and shock isolation packaging. In addition to reduction in transmitted impact forces, our invention provides clear, irreversible visual indication of the state of readiness of the protective gear to which it is fitted.

The present invention takes advantage of the energy absorption efficiency of permanently deformed structures while ensuring that the equipment provides improved impact attenuation performance at below-threshold impact energies and continues to provide sufficient protective capability even following a change of state of readiness resulting from permanent deformation response to above-threshold impacts.

Furthermore, the present invention may clearly communicate the state of readiness to the user, providing guidance indicating that the shock absorber apparatuses have been activated and for the user to retire and/or replace the protective gear in question.

The present invention may utilize multiple channels of impact energy management, including at least one rebounding channel, which may deform elastically in response to impact, and at least one crush channel, which may deform plastically and/or permanently in response to impact. The systems of the present invention may preferably be configured so that only the at least one rebounding channel may be active for impacts below a selected design threshold of impact energy, and both the at least one rebounding channel and the at least one crush channel may be engaged for impacts above the selected design threshold.

Materials that may be used for the rebounding channel may include materials that may rebound after absorbing energy. For example, the rebounding channel may be formed from elastomers, polymer foams, viscoelastic polymers and foams, air bladders, liquid soft shock absorbers, open lattices of solid polymer materials, laminations of two or more of these materials, and/or other similar materials. Discs, sheets, spheroids (hollow and solid), tubes, cylinders, bellows, bulbs, bells, and scalloped tubes may be suitable geometric configurations for the rebounding channel elements.

Materials that may be used for the permanent deformation channel elements may include ductile materials with large elongations after yield and before ultimate break, and with relatively flat load/deflection curves between tensile yield stress and ultimate stress. Numerous filled and unfilled polymer compounds may fit this description, most notably ultra-high molecular weight (UHMW) material and high density polyethylene (HDPE). Other compounds such as nylon 6,6 and about 0% to about 30% glass and carbon fiber fill ratios may also be suitable. Ductile metals, such as aluminum alloys (most notably in the 3000 series), as well as ductile steels, copper, tin, and/or other like metals may be formed into crush structures with very precise specifiable crumple response. Thin wall structures in the form of truncated cones, cylinders, stepped conical pyramids, hourglasses, spheroids, honeycombs, bundled tubes, and other like shapes and structures, may be configured as primary high energy impact absorbers. Organic materials such as corrugated cardboard or other plant-based fibers sheets can also be utilized to create permanently deformable elements.

These crush structures may also be "pre-crushed" in the manufacturing process to ensure predictable buckling behavior at constant force, without an initial force spike required to initiate collapse of the structure.

Various classes of permanent deformation may be used in the crush channel. Plastic deformation via buckling, tensile elongation, shear failure, skiving, circumferential elongation, and other like permanent deformation, may be representative of permanent deformation modes effective in energy absorption for the present invention.

Figure 1B:
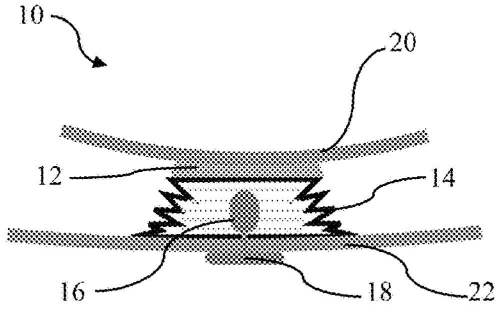

Employing both rebounding and permanent crush channel elements can be done in several ways; in series, parallel, or both. FIGS. 1A and 1B illustrate a first exemplary embodiment of a shock absorber apparatus 10 having a rebounding channel 12 and a crush channel 14 in a serial configuration. Specifically, the rebounding channel 12 may comprise a material that forms a viscoelastic spring. In addition, the crush channel 14 may be formed from a permanently deformable material, as described above, in the shape of a bell or cylinder. The shock absorber apparatus 10 may be attached to a base 22 having a window 18 that may be a specific color, such as green. The window 18 may be connected to a deformable indicator bulb 16 having an indicator fluid or other material therein.

As illustrated in FIG. 1A, the shock absorber apparatus 10 may be impacted by a surface 20 that may impact the rebounding channel 12 with a relatively low energy impact, such as an impact of less than a predetermined threshold. For example, as illustrated in FIG. 1A, the predetermined threshold may be about 20 G of force, although it should be noted that the predetermined threshold may be any energy level desired. Thus, any impact less than predetermined threshold, in this case, 20 G of force as illustrated in FIG. 1A, may be absorbed by the rebounding layer 12, which may absorb the impact and rebound to its original shape. As such, the crush channel 14 and the bulb 16 containing the indicator fluid or other material may fail to be impacted or deformed, thereby maintaining the color of the window 18 its original color, such as green.

As illustrated in FIG. 1B, the shock absorber apparatus 10 may be impacted by a surface 20 that may impact the rebounding channel 12 with a relatively high energy impact, such as an impact of greater than the predetermined threshold. Thus, any impact greater than the predetermined threshold, in this case, 20 G of force as illustrated in FIG. 1B, may be absorbed by both the rebounding channel 12 and the crush channel 14, which may absorb the impact causing the crush channel to permanently deform.

When the crush channel 14 is permanently deformed, the indicator septum, bulb, or marker 16 may be impacted, thereby pushing the indicator fluid or other material from the indicator bulb 16 into the window 18, thereby changing the color of the window 18. When the color of the window 18 changes, a user may be informed that the shock absorber apparatus 10 has absorbed the impact greater than the predetermined threshold and has become permanently deformed. For example, if the indicator fluid is red, the indicator fluid may be pushed from the bulb 16 causing the window 18 to turn red.

In an alternate embodiment, the indicator may be electrical and/or electronic, such that permanent deformation of the crush channel 54 may cause the indicator to electronically inform a user that the crush channel 54 has become permanently deformed, requiring retirement and/or replacement thereof. It should be noted that any indicator may be utilized to indicate that the crush channel 54 has become permanently deformed, and the present invention should not be limited as described herein.

Figure 2A:
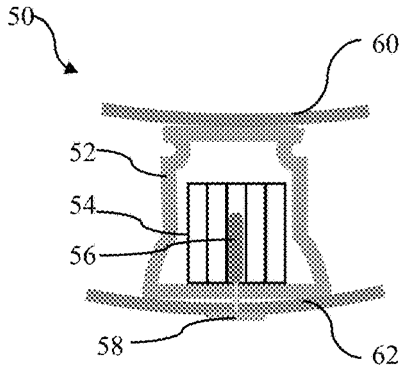
FIGS. 2A-2C illustrate a hybrid crush zone shock absorber employing an elastic, viscoelastic and/or soft liquid hydraulic element and a permanently deforming element predominately in parallel arrangement, in an embodiment of the present invention.
Figure 2B:
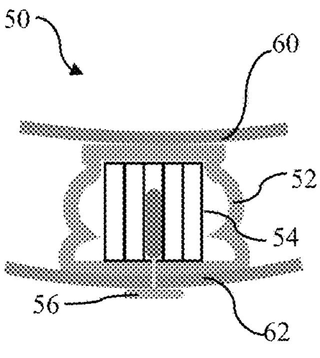
Figure 2C:
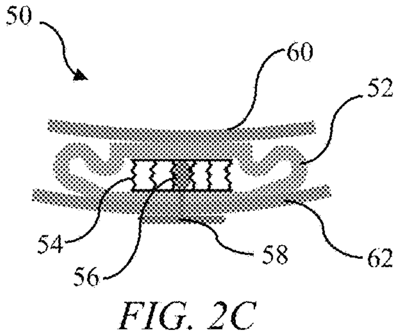

In a preferred exemplary embodiment, illustrated in FIGS. 2A-2C, a shock absorber apparatus 50 may use both serial and parallel configurations. Specifically, the shock absorber apparatus may have a rebounding channel 52 and a crush channel 54. The rebounding channel 52 may use a viscoelastic spring in a particular shape configuration that provides rebound at both low energy impacts, such as, for example, less than about 10 G of force, and at medium energy impacts, such as, for example, between about 10 G and about 40 G of force. The crush channel 54 may absorb energy impacts of relatively high energy levels, such as, for example, above about 40 G of force, which may cause the crush channel 54 to become permanently deformed.

The crush channel 54 may be, as illustrated in FIGS. 2A-2C an aluminum honeycomb crush element that is surrounded both radially and axially by the viscoelastic polymer rebounding channel 52. An indicator septum or bulb 56 having an indicator fluid or other material therein may be within the crush channel 54 which may be connected to a window 58. As with the exemplary embodiment shown in FIGS. 1A-1B, the window 58 may be a first color indicating that the shock absorber apparatus 50 is still useful because no energy impact has caused the crush channel 54 to become permanently deformed. When the crush channel 54 becomes permanently deformed due to relatively high energy impacts, the indicator fluid or other material may flow from the septum or bulb 56 into the window 18, thereby indicating to a user that the crush channel 54 has been permanently deformed and that the shock absorber apparatus should be retired and/or replaced.

As shown in FIG. 1A, a relatively low energy impact from surface 60 may cause the rebounding channel 52 to slightly deform and spring back to its original shape. This may be due to the viscoelastic material used, the shape of the rebounding channel, or both. Likewise, at a medium energy impact may cause the rebounding channel 52 to become more temporarily deformed, but may spring back to its original shape, as illustrated in FIG. 2A. Because the crush channel 54 had not be impacted, the septum or bulb 56 may be unimpacted, thereby maintaining the window 58 its original color.

A high energy impact, shown in FIG. 2C, may cause deformation of both the rebounding channel 52 and the crush channel 54, causing the crush channel to become permanently deformed. Upon deformation of the crush channel 54, the indicator fluid or other material may move from the septum or bulb 56 into the window 58, thereby indicating to a user that the crush channel 54 has become permanently deformed and should be retired and/or replaced.

It should be noted that rebounding and permanent crush channels 52, 54 do not need to be coaxial and may be spaced or staggered to cover a protected area. Furthermore, the deformation of the "permanent" crush element need not be permanent; self-restoring elastic buckling structures may be used instead and/or in addition to permanent deformation structures.

FIG. 3 illustrates an exemplary flowchart 100 in an embodiment of the present invention. Specifically, a shock absorber apparatus of the present invention may be used, such as in a helmet, a pad, armor, or other like application. Upon receiving an energy impact event 102, the material, structure, or other like properties may dictate whether the energy impact event is above a predetermined threshold, as in step 105, defined by the material, structure, or other like properties. If not above the predetermined threshold, only the rebounding channel may be temporarily deformed, as in step 106, in which case the rebounding channel may return to its original state.

If the impact event is above the predetermined threshold, shown in step 104, both the rebounding channel and the crush channel may be deformed as in step 108. In such a case, the rebounding channel may rebound to its original position, but if the energy impact is still not sufficiently high to rupture the indicator septum, bulb, and/or marker, as shown in step 110, then the shock absorber apparatus may be utilized again to receive another energy impact event 102. However, if the energy impact 102 is high enough to rupture the indicator septum, bulb, and/or marker, as shown in step 110, then the visual indicator, such as the window as described above, may change color, as in step 112. Once the visual indicator indicates that the septum, bulb, and/or marker has ruptured, then the apparatus and/or the shock absorber apparatus may be replaced, as in step 114.

In another exemplary embodiment, FIGS. 4A-4F illustrates a deformable crush channel element 150. FIGS. 4A-4F illustrate a series of concentric staggered geometries or rings that may be formed or molded into a single part. Injection-molded glass-filled Nylon, HDPE, and UHMWPE may be useful. Each stacked segment may be of similar total thickness and may be designed to deform into the negative space beneath it, under a specified load. One segment (i.e., the lowest, or the highest, or an intermediate, for example) may be designed to fail first at the lowest load threshold and subsequent segments may fail at progressively higher loads, collapsing into the adjacent space until all segments have completely collapsed into the approximate thickness of a single segment as shown in FIG. 4F. In this way, crush channel element 150 may absorb one large impact or multiple low to medium impacts before its force attenuation capacity has been exhausted.

The proportion of rebound elements to crush elements may be designed to ensure that even after one or more crush channels have been permanently deformed, the rebound channels provide sufficient protection to allow the protective gear to serve the user until a replacement can be obtained. Specifically, the ratio of rebounding to crush elements does not need to be 1:1. Moreover, size, stroke, spacing and quantity of rebounding and crush channels may vary significantly from application to application.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A shock absorber apparatus comprising:

a first energy absorber element, wherein the first energy absorber element is temporarily deformable below a predefined energy impact threshold level;

a hollow second energy absorber element including walls surrounding a cavity, the walls of the second energy absorber element being permanently deformable above the predefined energy impact threshold level; and an indicator fluid present within the second energy absorber element, wherein the indicator fluid is configured to flow into an indicator window disposed outside the second energy absorber element after deformation of the second energy absorber element.

2. The shock absorber apparatus of claim 1 wherein the first energy absorber element is disposed in series with the second energy absorber element.

3. The shock absorber apparatus of claim 1 wherein the first energy absorber element is disposed in parallel with the second energy absorber element.

4. The shock absorber apparatus of claim 1, wherein the indicator indicates to a user that the second energy absorber element has become permanently deformed when the second energy absorber element becomes permanently deformed.

5. The shock absorber apparatus of claim 1 wherein the first energy absorbing element comprises a viscoelastic material.

6. The shock absorber apparatus of claim 1 wherein the second energy absorbing element is made from a ductile material.

7. A shock absorber apparatus comprising:

a first energy absorber element, wherein the first energy absorber element is temporarily deformable below a predefined energy impact threshold level, a second energy absorber element, wherein the second energy absorber element is not deformable below the predefined energy impact threshold and further is permanently deformable above the predefined energy impact threshold level, wherein the second energy absorber element is a single monolith including a first segment, a second segment, and a third segment, wherein the first segment is deformable below a first predefined energy impact sub-level, the second segment and the third segment not being deformable below the first predefined energy impact sub-level, the second segment being deformable at a second predefined energy impact sub-level greater than the first predefined energy impact sub-level, the third segment not being deformable below the second predefined energy impact sub-level, wherein the third segment is deformable at a third predefined energy impact sub-level greater than the second predefined energy impact sub-level, the first, second, and third segments being stackable within one another; and an indicator fluid present within the second energy absorber element, wherein the indicator fluid is configured to flow into an indicator window disposed outside the second energy absorber element after deformation of the second energy absorber element.

8. The shock absorber apparatus of claim 7 wherein the first energy absorbing element comprises a viscoelastic material.

9. The shock absorber apparatus of claim 7 wherein the second energy absorbing element is made from a ductile material.

10. The shock absorber apparatus of claim 7 wherein the first segment is collapsible into a space defined by the second energy absorber element.

11. The shock absorber apparatus of claim 7 wherein the first segment includes a first ring and the second segment includes a second ring, the first ring having a smaller diameter than the second ring.

12. The shock absorber apparatus of claim 7 wherein the first energy absorber element is disposed in series with the second energy absorber element.

13. The shock absorber apparatus of claim 7 wherein the first energy absorber element is disposed in parallel with the second energy absorber element.

14. A method of using a shock absorber apparatus on an article, the method comprising the steps of:

providing an article;

providing a shock absorber apparatus on the article, the shock absorber apparatus comprising a first energy absorber element, wherein the first energy absorber element is temporarily deformable below a predefined energy impact threshold level, and a hollow second energy absorber element, wherein the second energy absorber element includes walls surrounding a cavity, the walls of the second energy absorber element being permanently deformable above the predefined energy impact threshold level, the shock absorber apparatus further comprising an indicator fluid present within the second energy absorber element;

impacting the shock absorber apparatus with a first energy, wherein the first energy causes the first energy absorber element to temporarily deform and does not cause the second energy absorber element to deform; and impacting the shock absorber apparatus with a second energy greater than the first energy, wherein the second energy causes the walls of the second energy absorber element to permanently deform and cause the indicator fluid to flow outside of the second energy absorber element into an indicator window.

* * * * *